United States Patent
Ju et al.

(10) Patent No.: US 10,836,925 B2
(45) Date of Patent: Nov. 17, 2020

(54) HYDROPHILIC COATING COMPOSITION

(71) Applicant: LG CHEM, LTD., Seoul (KR)

(72) Inventors: Chang Hwan Ju, Daejeon (KR); Hee Jung Choi, Daejeon (KR); Jeongae Yoon, Daejeon (KR); Yeong Rae Chang, Daejeon (KR); Sung Soo Yoon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 47 days.

(21) Appl. No.: 16/345,359

(22) PCT Filed: Dec. 26, 2017

(86) PCT No.: PCT/KR2017/015482
§ 371 (c)(1),
(2) Date: Apr. 26, 2019

(87) PCT Pub. No.: WO2018/124698
PCT Pub. Date: Jul. 5, 2018

(65) Prior Publication Data
US 2019/0315996 A1    Oct. 17, 2019

(30) Foreign Application Priority Data

Dec. 28, 2016  (KR) .................. 10-2016-0180834

(51) Int. Cl.
| C09D 133/14 | (2006.01) |
| C09D 5/00 | (2006.01) |
| B32B 17/10 | (2006.01) |
| B32B 27/30 | (2006.01) |

(52) U.S. Cl.
CPC ............ *C09D 133/14* (2013.01); *C09D 5/00* (2013.01)

(58) Field of Classification Search
None
See application file for complete search history.

(56) References Cited

U.S. PATENT DOCUMENTS

| 2004/0063881 A1 | 4/2004 | Lewis et al. |
| 2010/0249267 A1 | 9/2010 | Jiang et al. |
| 2012/0245250 A1 | 9/2012 | Kano et al. |
| 2013/0178125 A1 | 7/2013 | Jiang et al. |
| 2016/0032036 A1 | 2/2016 | Okazaki |

FOREIGN PATENT DOCUMENTS

| CN | 102666753 A | 9/2012 |
| CN | 103450419 A | 12/2013 |
| CN | 104262555 A | 1/2015 |
| JP | 2010-47739 A | 3/2010 |
| JP | 2011-503332 A | 1/2011 |
| JP | 2012-007053 A | 1/2012 |
| JP | 2014-133784 A | 7/2014 |
| JP | 2015-105313 A | 6/2015 |
| KR | 10-2015-0135518 A | 12/2015 |
| KR | 10-2018-0000240 A | 1/2018 |
| WO | 1998-022162 A1 | 5/1998 |
| WO | 2009-067565 A3 | 5/2009 |
| WO | WO 2009/119690 A1 * | 10/2009 |

OTHER PUBLICATIONS

Extended European Search Report issued for European Patent Application No. 17886394.0 dated Sep. 10, 2019, 9 pages.
International Search Report and Written Opinion issued for International Application No. PCT/KR2017/015482 dated Apr. 12, 2018, 11 pages.
Q. Zhang et al., "Thermo-sensitive zwitterionic block copolymers via ATRP", RSC Advances, 2014, vol. 4, No. 46, pp. 24240-24247.
K. E. B. Doncom et al., "The direct synthesis of sulfobetaine-containing amphiphilic block copolymers and their self-assembly behavior", European Polymer Journal, 2017, vol. 87, pp. 497-507.
J. Zhao et al., "Long circulating micelles of an amphiphilic random copolymer bearing cell outer membrane phosphorylcholine zwitterions", Acta Biomaterialia, 2015. vol. 16, pp. 94-102.
S. Guo et al., "Surface charge control for zwitterionic polymer brushes: Tailoring surface properties to antifouling applications", Journal of Collioid and Interface Science, 2015, vol. 452, pp. 43-51.

* cited by examiner

*Primary Examiner* — Tae H Yoon
(74) *Attorney, Agent, or Firm* — Rothwell, Figg, Ernst & Manbeck, P.C.

(57) ABSTRACT

Provided is a hydrophilic coating composition, and more particularly, a hydrophilic coating composition including both a block copolymer and a random copolymer, each including repeating units of particular structures, wherein the hydrophilic coating composition may impart a hydrophilic property to the surface of a substrate when applied to the surface, while having excellent adhesiveness to the substrate.

18 Claims, No Drawings

HYDROPHILIC COATING COMPOSITION

CROSS REFERENCE TO RELATED APPLICATION(S)

This application is a 35 U.S.C. § 371 National Phase Entry Application from PCT/KR2017/015482, filed on Dec. 26, 2017, and designating the United States, which claims the benefit of priority to Korean Patent Application No. 10-2016-0180834, filed on Dec. 28, 2016, the entire disclosures of which are incorporated herein by reference.

TECHNICAL FIELD

The present invention relates to a hydrophilic coating composition, and more particularly, to a hydrophilic coating composition which includes both of a block copolymer and a random copolymer, each including repeating units of particular structures, thereby imparting a hydrophilic property to the surface of a substrate when applied to the substrate while having excellent adhesiveness to the substrate.

BACKGROUND ART

As a method of preventing contamination of a solid surface such as glass, a metal, fibers, etc., a hydrophobic surface treatment method of facilitating water repellency and a hydrophilic surface treatment method are known.

The hydrophobic surface treatment is a method of preventing water-soluble contaminants from adhering easily by performing surface treatment of the solid surface of glass, a metal, fibers, etc. to impart water repellency to the surface.

For example, there is a method of imparting a waterproof effect to clothes by treating the clothes with a softening agent or by separately spraying a water repellent thereto after washing, or a method of imparting water repellency to a vehicle by applying wax onto a painted surface thereof.

However, these methods have problems in that complete hydrophobic treatment of the solid surface is difficult, and when the surface is repeatedly contacted with the water-soluble contaminants, the contaminants are accumulated on the solid surface, and thus it is difficult to exert a sufficient anti-fouling effect.

Meanwhile, the method of preventing contamination by hydrophilic surface treatment is to facilitate contact with water or water-soluble substances by decreasing a water contact angle on the solid surface. After the treatment, even if contaminants adhere to the solid surface, they may be easily removed at the time of cleaning using water.

Fogging or frosting of the surface of glass, a mirror, a transparent plastic, etc. may thereby be prevented, and an antistatic effect on the surface may also be obtained.

The hydrophilic surface treatment method may be exemplified by a method of treating with a composition containing amphoteric polymer electrolytes, a method of treating with a composition containing a surfactant and a polymer material having a specific structure of amphoteric ions, etc.

However, since the above compositions have a high hydrophilic property, it is difficult to secure excellent adhesiveness on a substrate which is required to be coated, such as glass, a metal, a plastic, etc.

Accordingly, there is a need to develop a method capable of imparting an anti-fouling hydrophilic property to the surface of the substrate while realizing excellent adhesiveness to the surface of the substrate.

DISCLOSURE

Technical Problem

The present invention provides a copolymer capable of imparting an anti-fouling hydrophilic property to the surface of a substrate such as glass, a metal, a plastic, etc. while realizing excellent adhesiveness to the substrate, a preparation method thereof, and a hydrophilic coating composition including the same.

Technical Solution

The present invention provides a hydrophilic coating composition including a block copolymer including a first repeating unit represented by the following Formula 1 and a second repeating unit represented by the following Formula 2; and a random copolymer including the first repeating unit represented by the following Formula 1 and the second repeating unit represented by the following Formula 2:

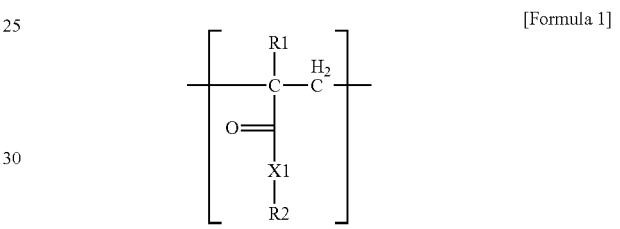

[Formula 1]

wherein, in Formula 1, R1 is hydrogen or a hydrocarbyl group having 1 to 10 carbon atoms, X1 is oxygen or a bivalent amine group (—NR'—), wherein R' is hydrogen or a hydrocarbyl group having 1 to 10 carbon atoms, and R2 is a zwitterionic group,

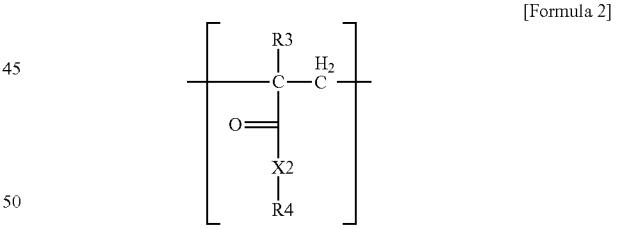

[Formula 2]

wherein, in Formula 2, R3 is hydrogen or a hydrocarbyl group having 1 to 10 carbon atoms, X2 is oxygen or a bivalent amine group (—NR"—), wherein R" is hydrogen or a hydrocarbyl group having 1 to 10 carbon atoms, and R4 is a silane moiety.

Effect of the Invention

A hydrophilic coating composition of the present invention may impart a hydrophilic property to the surface of a substrate such as glass, a metal, a plastic, etc. by including copolymers having both cations and anions, thereby effectively preventing surface contamination and achieving excellent adhesiveness to the surface of the substrate.

DETAILED DESCRIPTION OF THE EMBODIMENTS

In the present invention, the terms "first", "second", and the like are used to describe a variety of components, and these terms are merely employed to differentiate a certain component from other components.

Further, the terms used in this description are just for explaining exemplary embodiments and are not intended to restrict the present invention. A singular expression may include a plural expression unless it is differently expressed contextually. It must be understood that the term "include", "equip", or "have" in the present description is only used for designating the existence of characteristics taken effect, numbers, steps, components, or combinations thereof, and does not exclude the existence or the possibility of addition of one or more different characteristics, numbers, steps, components, or combinations thereof beforehand.

In the present invention, it will also be understood that when a layer or an element is referred to as being formed "on" or "above" another layer or element, the layer or element may be directly formed on another layer or element, or other layers or elements may be additionally formed between the layers or on an object or a substrate.

While the present invention is susceptible to various modifications and alternative forms, specific embodiments will be illustrated and described in detail as follows. It should be understood, however, that the description is not intended to limit the present invention to the particular forms disclosed, but on the contrary, the intention is to cover all modifications, equivalents, and alternatives falling within the spirit and scope of the invention.

As used herein, the hydrocarbyl group refers to a monovalent functional group that is formed by removing one hydrogen atom from a linear or branched aliphatic or aromatic hydrocarbon.

Further, a hydrocarbylene refers to a divalent functional group that is formed by removing two hydrogen atoms from a linear or branched aliphatic or aromatic hydrocarbon.

Furthermore, (meth)acrylate or (meth)acrylamide refers to a compound having substitution of a hydrogen atom or a methyl group, or various kinds of hydrocarbyl groups at a carbonyl alpha carbon of an acrylate group or an acrylamide group.

Hereinafter, the present invention will be described in more detail.

A hydrophilic coating composition according to an aspect of the present invention may include a block copolymer including a first repeating unit represented by Formula 1 and a second repeating unit represented by Formula 2; and a random copolymer including the first repeating unit represented by Formula 1 and the second repeating unit represented by Formula 2.

In the case of a known hydrophilic surface treatment method, when a polymer substance including a hydrophilic moiety is applied to the surface of a substrate, the substance is dissolved in water, and thus it is difficult to maintain surface properties. Even when a photocatalyst of a particle phase is introduced, there is a disadvantage in that it is easily peeled off by an external force owing to the surface unevenness of the substrate.

Further, although a method of introducing a separate functional group at the terminal ends of the hydrophilic polymer substance is used in order to secure adhesiveness, there are disadvantages in that the introduction of the functional group is often impossible depending on characteristics of the hydrophilic polymer substance or the terminal functional group, and it is also difficult to secure sufficient surface stability on the surface of the substrate due to a wide molecular weight distribution of the polymer.

The random and block copolymers included in the hydrophilic coating composition according to an aspect of the present invention may include a first repeating unit that is derived from a (meth)acrylate-based or (meth)acrylamide-based unsaturated monomer including a zwitterionic group in the side chain thereof.

The phrase 'including a zwitterionic group in the side chain thereof' means that the (meth)acrylate-based or (meth)acrylamide-based unsaturated monomer constitutes the repeating unit to form the main chain of the copolymer and the zwitterionic group is linked to the side chain of each repeating unit through an ester or amide bond.

Due to the zwitterionic group included in the side chain, the above-described copolymer has partial charges in many portions, and these partial charges impart a hydrophilic or ultrahydrophilic property to the copolymer. Accordingly, when the copolymer is applied onto a substrate, a hydrophilic or ultrahydrophilic surface may be imparted to the substrate.

Further, the random and block copolymers included in the hydrophilic coating composition according to an aspect of the present invention may include a second repeating unit that is derived from a (meth)acrylate-based or (meth)acrylamide-based unsaturated monomer including a silane moiety in the side chain thereof.

The silane moiety may form a silane or silanol bond with the surface of a substrate, when the copolymer is applied onto the substrate. Due to this bond, the copolymer may obtain excellent adhesiveness to the surfaces of a variety of organic or inorganic substrates.

The first repeating unit included in the above-described copolymer is represented by the following Formula 1:

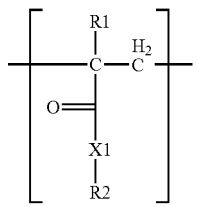

[Formula 1]

wherein, in Formula 1, R1 is hydrogen or a hydrocarbyl group having 1 to 10 carbon atoms, X1 is oxygen or a bivalent amine group (—NR'—), wherein R' is hydrogen or a hydrocarbyl group having 1 to 10 carbon atoms, and R2 is a zwitterionic group.

Further, R2 is a zwitterionic group to impart a hydrophilic property to the copolymer of the present invention, wherein a positively charged atom and a negatively charged atom may be adjacent to each other (a ylide group) or may not be adjacent to each other (a betaine group), but the betaine form of not being adjacent to each other may be more advantageous in terms of improving the hydrophilic property of the copolymer.

In the hydrophilic coating composition according to one embodiment of the present invention, the zwitterionic group may be represented by the following Formula 1-1:

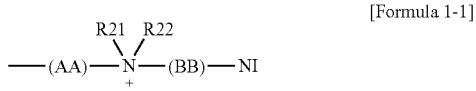

[Formula 1-1]

wherein, in Formula 1-1, R21 and R22 are each independently the same as or different from each other, and may be a hydrocarbyl group having 1 to 10 carbon atoms, (AA) and (BB) are each independently the same as or different from each other, and may be a hydrocarbylene group having 1 to 10 carbon atoms, and NI is —SO$_3$— or —CO$_3$—.

In other words, the zwitterionic group included in the copolymer of the present invention may preferably be in the form of an ammonium-sulfonate betaine, an ammonium-carbonate betaine, or a phosphate-ammonium betaine.

In particular, each of R21 and R22 which are functional groups bound to the nitrogen atom of ammonium may be a hydrocarbyl group having 1 to 10 carbon atoms, and more preferably, may be an alkyl group having 1 to 3 carbon atoms such that the nitrogen atom forms a quaternary ammonium, for localization of the positive charges at the nitrogen atom in terms of improving the hydrophilic property.

(AA) and (BB) which are linkers included in the zwitterionic group may each independently be the same as or different from each other, may be a hydrocarbylene group having 1 to 10 carbon atoms, and more preferably, may be an alkylene group having 1 to 5 carbon atoms or an arylene group having 6 to 10 carbon atoms in terms of hydrophilicity improvement, polymer stability, and easy formation of the polymer.

The second repeating unit may be represented by the following Formula 2:

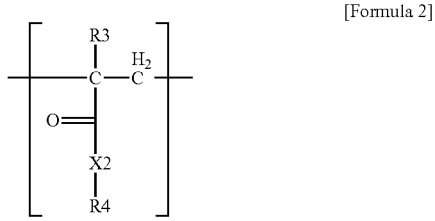

[Formula 2]

wherein, in Formula 2, R3 is hydrogen or a hydrocarbyl group having 1 to 10 carbon atoms, X2 is oxygen or a bivalent amine group (—NR"—), wherein R" is hydrogen or a hydrocarbyl group having 1 to 10 carbon atoms, and R4 is a silane moiety.

R3 which is a functional group bound to the carbonyl alpha carbon of acrylate or acrylamide may be hydrogen or a hydrocarbyl group having 1 to 10 carbon atoms, and preferably, may be hydrogen or a linear or branched alkyl group having 1 to 10 carbon atoms.

The silane moiety may be represented by the following Formula 2-2:

[Formula 2-2]

wherein, in Formula 2-2, R40 is a single bond or a hydrocarbylene group having 1 to 10 carbon atoms, and R41 to R43 are each independently the same as or different from each other, and may be hydrogen, a hydroxy group, a hydrocarbyl group having 1 to 10 carbon atoms, or a hydrocarbyloxy group having 1 to 10 carbon atoms.

R40 is a group to adjust a length of the side chain to which the silane moiety binds, it may preferably be an alkylene group having 1 to 10 carbon atoms, and the length may be appropriately adjusted in terms of improving adhesiveness according to characteristics of the copolymer and characteristics of a substrate to be coated.

The block copolymer and the random copolymer, independently, may preferably include the first repeating unit and the second repeating unit at a ratio of about 9:1 to about 99.9:0.1. The first repeating unit, i.e., the repeating unit including the zwitterionic group, may serve to impart an ultrahydrophilic property to the substrate surface, and the repeating unit including the silane moiety may serve to improve adhesiveness through a silanol bond with the substrate. However, when the repeating unit including the silane moiety is included at a predetermined level or more, there is a problem in that the hydrophilic property may be lost without a significant increase in adhesiveness. Accordingly, in terms of excellent ultrahydrophilic property of the substrate surface and adhesiveness to the substrate, the first repeating unit and the second repeating unit are preferably included at a ratio of about 9:1 to about 99.9:0.1.

Further, the hydrophilic coating composition according to one embodiment of the present invention may include the block copolymer and the random copolymer at a weight ratio of about 5:5 to about 0.1:99.9, preferably about 4:6 to about 0.1:99.9, or about 2:8 to about 0.5:99.5, such that the hydrophilic coating composition may preferably have a higher content of the random copolymer than the block copolymer. With regard to the random copolymer, the repeating unit including the zwitterionic group and the repeating unit including the silane moiety are relatively homogeneously mixed in the polymer to achieve excellent adhesiveness to a substrate, which is advantageous in terms of realizing abrasion resistance. With regard to the block copolymer, the repeating unit including the zwitterionic group and the repeating unit including the silane moiety form alternating blocks having a predetermined length to impart an excellent ultrahydrophilic property to the substrate surface, which is advantageous in terms of improving an initial water contact angle property. According to an embodiment of the present invention, when the block copolymer and the random copolymer are included in the above range of the ratio, excellent initial water contact angle and abrasion resistance properties may be realized, and when the content of the block copolymer is increased, there is a problem in that the abrasion resistance property may deteriorate.

According to another embodiment of the present invention, the block copolymer may be in the form where the above-described first repeating unit and second repeating unit are alternately polymerized in a predetermined repeating number, and specifically, the block copolymer may include a repeating unit represented by the following Formula 3:

[Formula 3]

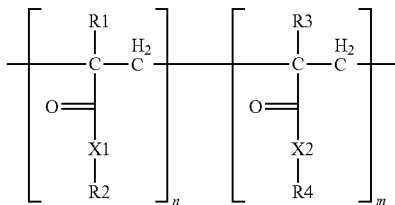

wherein, in Formula 3, R1 and R3 are each independently the same as or different from each other, and may be hydrogen or a hydrocarbyl group having 1 to 10 carbon atoms, X1 and X2 are each independently the same as or different from each other, and may be oxygen or a bivalent amine group (—NR'—), wherein R' is hydrogen or a hydrocarbyl group having 1 to 10 carbon atoms, R2 is a zwitterionic group, R4 is a silane moiety, N is an integer of 10 to 3000, and m is an integer of 1 to 50.

Due to this structure, the second repeating unit portion is adhered to a substrate, and the first repeating unit portion is oriented in a vertical direction while not being adhered to the substrate, thereby realizing excellent hydrophilic property and adhesiveness. In particular, when the first repeating unit is located at the center of the copolymer and the second repeating unit is located at both ends thereof, the hydrophilic property, adhesiveness to the substrate, and adhesion durability may be further improved.

The block copolymer and the random copolymer each having a weight average molecular weight of about 100,000 g/mol to about 800,000 g/mol and a molecular weight distribution of about 1.1 to about 3.0 are advantageous in terms of improving the hydrophilic property and adhesiveness to the substrate.

Further, the copolymer may include a RAFT reactive group at least one end thereof.

Specifically, the RAFT reactive group may have the following structural formula:

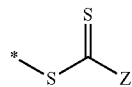

wherein, in the structural formula, S is a sulfur atom, * is a portion linked to the repeating unit of the copolymer, and Z which is a terminal end included in the RAFT reactive group may be a hydrocarbylene group having 1 to 10 carbon atoms, substituted or unsubstituted with various substituents.

That is, in the copolymer of the present invention, the repeat number of the repeating units and the type of polymerization may be determined according to the RAFT groups at both ends thereof.

Meanwhile, the random and block copolymers may be prepared by polymerizing the (meth)acrylate-based or (meth)acrylamide-based unsaturated monomer (hereinafter referred to as a first monomer) including the zwitterionic group in the side chain thereof; and the (meth)acrylate-based or (meth)acrylamide-based unsaturated monomer (hereinafter referred to as a second monomer) including the silane moiety in the side chain thereof in the presence of an initiator.

The initiator may be exemplified by an azo-based initiator, a peroxide-based initiator, a persulfate-based initiator, a phosphate-based initiator, a diazo-based initiator, a disulfide-based initiator, etc., and these polymerization initiators may be used alone or in combination of two or more thereof. However, the present invention is not limited thereto, and the polymerization initiator may be appropriately selected according to the kind and characteristics of the above-described monomers.

The amount of the polymerization initiator is not particularly limited, but the polymerization initiator may be generally used in an amount of about 0.01 parts by weight to about 5 parts by weight with respect to the total weight of the above-described first and second monomers.

Further, a polymerization method used in the polymerization of the monomers may preferably be, for example, a solution polymerization method, etc., but is not limited thereto. When the monomers are polymerized by the solution polymerization method, the above-described first and second monomers may be polymerized by, for example, dissolving them in a solvent and adding the polymerization initiator thereto while stirring the obtained solution.

The solvent applicable to the solution polymerization method is not particularly limited, as long as it does not cause a problem of inhibiting the polymerization reaction, etc., and a polar solvent may preferably be used in view of solubilities of the above-mentioned monomers.

The polymerization solvent may be exemplified by alcohols such as methanol, ethanol, isopropanol (IPA), 1-propanol, 1-butanol, cyclohexanol, benzyl alcohol, ethylene glycol, propylene glycol, propylene glycol monomethyl ether, etc., polar aprotic solvents such as acetonitrile, sulfolane, dimethyl sulfoxide, N,N-dimethylformamide (DMF), N,N-dimethylacetamide (DMAc), N,N-dimethyl imidazolidinone (DMI), etc., water, and mixtures thereof.

The amount of the solvent may preferably be adjusted in view of solubilities of the first and second monomers so that a total concentration of the above-described monomers in the solution becomes about 10% by weight to about 80% by weight when the solvent is mixed with the monomers.

Further, the polymerization temperature may be generally determined according to 10-hour half-life temperature of a radical polymerization initiator, and the polymerization may be performed at room temperature to about 150° C., preferably at about 40° C. to about 100° C.

The polymerization is preferably performed under an atmosphere of an inert gas to the reaction of the above-described monomers. Specifically, a gas such as nitrogen, argon, etc. may be exemplified, and this gas is bubbled into a solution in which the monomers are mixed to remove oxygen which may be mixed in the solution and to prevent oxygen from affecting the radical properties of the polymerization reaction.

According to one embodiment, the polymerization step may preferably be performed according to a controlled radical polymerization (CRP) method. Specific examples of the CRP method may include atom transfer radical polymerization (ATRP), nitroxide-mediated radical polymerization (NMP), telluride-mediated polymerization (TERP), RAFT polymerization, etc. Among them, the RAFT polymerization which is performed in the presence of a RAFT reagent may be the most preferred.

When a general radical polymerization is performed, a compound having an —SH (mercapto) group is usually used. In this regard, many side reactions may occur because of high reactivity of radicals, and thus it is difficult to obtain a high molecular weight polymer having a narrow molecular weight distribution.

When the reaction is performed in the presence of the RAFT reagent, it shows high stability under conditions of reaction with functional groups of monomers and does not cause rate-retarding reactions, thereby facilitating the polymerization by the radical reaction. Specifically, when the polymerization reaction is performed in the presence of the RAFT reagent, the RAFT reagent serves as a radical propagation medium, and thus the monomers are separated from the RAFT reagent and polymerization reaction of the separated monomers is promoted, thereby easily obtaining a high molecular weight polymer having a narrow molecular weight distribution.

Further, in the present invention, a silane-based RAFT reagent including the RAFT reactive group at one end thereof is used to more accurately adjust the molecular weight distribution of the copolymer to be polymerized. The silane-based unsaturated monomer may be added to the end of the polymerization process to attach a specific type of silane group to both ends of the copolymer. Since this structure may be accurately controlled, the hydrophilic property of the copolymer to be prepared and its adhesiveness to a substrate may be more easily improved.

A specific example of the actual reaction is as follows.

First, the above-described first and second unsaturated monomers and the silane-based RAFT reagent are introduced into a reactor equipped with a nitrogen supplier, a condenser, a stirrer, and the like, and the reactants were homogeneously mixed in a solution state while stirring for about 10 minutes to about 120 minutes.

The radical initiator was added thereto, and the mixture was stirred for about 1 hour to about 5 hours under an atmosphere of a gas that does not participate in the reaction, thereby removing oxygen in the reactor. At this time, to improve solubility of the (meth)acrylate-based or (meth)acrylamide-based unsaturated monomer, complexes or salts capable of maintaining a charge balance may also be added.

The polymerization reaction may be performed for about 2 hours to about 8 hours while increasing the internal temperature of the reactor in the range of about 50° C. to about 90° C. The above-described copolymer may be obtained as a resulting product in a solution mixture.

In this regard, the first monomer is to form the (meth)acrylate- or (meth)acrylamide-based repeating unit including the zwitterionic group in the above-described copolymer, and the first monomer may be specifically represented by the following Formula 1a, and the second monomer is to form the (meth)acrylate- or (meth)acrylamide-based repeating unit including the silane moiety in the above-described copolymer, and the second monomer may be specifically represented by the following Formula 2a.

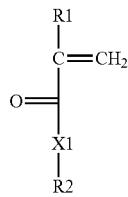

[Formula 1a]

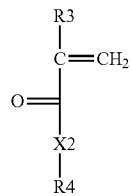

[Formula 2a]

In addition, parts and features of the monomers are the same as in the description of the first repeating unit and the second repeating unit of the copolymer.

Besides the above-described method of performing RAFT copolymerization in the presence of the RAFT reagent and the initiator after introducing the first monomer and the second monomer at the same time, a method of performing the polymerization by varying the injection order and amount of each monomer may be used to form the random or block copolymer.

For example, the preparation method may include the steps of mixing the RAFT reagent with the (meth)acrylate- or (meth)acrylamide-based unsaturated monomer including the silane moiety in the side chain thereof; performing a first polymerization reaction in the presence of the initiator; introducing the (meth)acrylate- or (meth)acrylamide-based unsaturated monomer including the zwitterionic group in the side chain thereof; and performing a second polymerization reaction in the presence of the initiator.

Since the RAFT reagent has very high stability with respect to the monomer including the zwitterionic group, various forms of the random or block copolymer may be easily prepared. Particularly, in the case of the RAFT reagent, since the radical leaving group of the RAFT reagent is linked as a main chain of the polymerization reaction, the structure of the repeating unit may be easily controlled by varying the injection order of the monomers. Specifically, in the case of varying the injection order of the first monomer and the second monomer, a first block may be formed by a single monomer, and then the other monomer may be dissolved in the solvent to extend the block chain, thereby forming a block copolymer.

Meanwhile, the present invention provides a hydrophilic coating composition including the copolymer.

According to one embodiment, the hydrophilic coating composition may further include a surfactant and a polyvalent organic acid, and may include one kind of copolymer or two or more kinds of copolymers.

The copolymer may be included in an amount of about 2 wt % or more, and more preferably about 5 wt % to about 30 wt %, with respect to the total weight of the hydrophilic coating composition. When the copolymer is included in a smaller amount than the above range, it may be difficult to impart a sufficient hydrophilic property to a target substrate. When the copolymer is included in a larger amount than the above range, viscosity becomes high, and thus it is difficult to prepare a homogeneous composition, it is hard to apply the composition to a substrate, and the hydrophilic property may be deteriorated.

The surfactant may further improve the hydrophilic property of the composition, and may further facilitate application of the composition onto the substrate surface. When the surfactant is included, the hydrophilic coating composition may be readily dispersed on the solid surface, which allows uniform coating, and as a result, the hydrophilic property may be further improved. In particular, when hydrophobic contaminants are present on the surface of a target substrate, the contaminants may be easily removed by the surfactant, and as a result, the hydrophilic property may be further improved.

The surfactant may be included in an amount of about 0.01 wt % to about 1 wt %, and more preferably, about 0.05 wt % to about 0.5 wt % with respect to the total weight of the hydrophilic coating composition.

A surfactant which is commonly used in a liquid detergent may be used as the surfactant without particular limitation, and an anionic surfactant, a non-ionic surfactant, a cationic surfactant, an amphoteric surfactant, etc. may be used.

The anionic surfactant may preferably be one or more selected from sulfuric acid ester salts, sulfonic acid salts, carboxylic acid salts, phosphoric acid ester salts, and amino acid salts.

Specifically, the anionic surfactant may include sulfuric acid ester salts such as alkyl sulfuric acid salts, alkenyl sulfuric acid salts, polyoxyalkylene alkyl ether lactic acid salts, polyoxyalkylene alkenyl ether lactic acid salts, polyoxyalkylene alkyl phenyl ether lactic acid salts, etc.; sulfonic acid salts such as sulfosuccinic acid alkyl ester salts, polyoxyalkylene sulfosuccinic acid alkyl ester salts, alkane sulfonic acid salts, internal olefin sulfonic acid salts, acyl isethionate, acyl methyltaurate, etc.; carboxylic acid salts such as higher fatty acid salts having 8 to 16 carbon atoms, polyoxyalkylene alkyl ether acetic acid salts, etc.; phosphoric acid ester salts such as alkyl phosphoric acid salts, polyoxyalkylene alkyl ether phosphoric acid salts, etc.; and amino acid salts such as acyl glutamic acid salts, alanine derivatives, glycine derivatives, arginine derivatives, etc.

In particular, polyoxyethylene alkyl ether lactic acid salts or higher fatty acid salts may be more preferred in order to improve the hydrophilic property.

The non-ionic surfactant may include polyethylene glycol-type non-ionic surfactants such as polyoxyethylene sorbitan fatty acid esters, polyoxyethylene sorbitan fatty acid esters, polyoxyethylene glycerin fatty acid esters, polyoxyethylene fatty acid esters, polyoxyethylene alkyl ethers, polyoxyethylene alkyl phenyl ethers, polyoxyalkylene (cured) castor oil, etc.; polyhydric alcohol-type non-ionic surfactants such as sucrose fatty acid ester, polyglycerin alkyl ethers, polyglycerin fatty acid esters, alkyl glucoside, etc.; fatty acid alkanolamide; etc.

In particular, polyoxyethylene alkyl ethers or alkyl glucoside may be more preferred.

The cationic surfactant may include quaternary ammonium salts, pyridinium salts, or tertiary amine organic acid salts having a hydrocarbon group having 12 to 20 carbon atoms, including an amide group, an ester group, or an ether group.

Specifically, the cationic surfactant may include trimethyl ammonium salts such as cetyl trimethyl ammonium salt, stearyl trimethyl ammonium salt, behenyl trimethyl ammonium salt, etc.; long-chain alkyl dimethylbenzyl ammonium salts such as stearyl dimethyl benzyl ammonium salt, etc.; dialkyl dimethyl ammonium salts such as distearyl dimethyl ammonium salt, diisotetradecyl dimethyl ammonium salt, etc.; and mono long-chain alkyl dimethyl amine salts such as acid salts of stearyl dimethyl amine, behenyl dimethyl ammonium, and octadecyloxypropyl dimethyl amine.

In particular, long-chain alkyl dimethylbenzyl ammonium salts may be more preferred.

The cationic surfactant may include betaine-based surfactants such as imidazoline-based betaine, alkyl dimethyl aminoacetic acid betaine, fatty acid amide propyl betaine, and sulfobetaines; and amine oxide-type surfactants such as alkyl dimethyl amine oxides, etc.

In particular, fatty acid amide propyl betaines such as lauric acid amidopropyl-N,N-dimethyl-acetic acid betaine, etc. may be more preferred.

The hydrophilic coating composition may further include a polyvalent organic acid having, in the molecule, two or more acidic groups such as a carboxylic acid group, a sulfonic acid group, or a phosphoric acid group.

For example, the polyvalent organic acid may include oxalic acid, maleic acid, citric acid, adipic acid, sebacic acid, malic acid, EDTA, nitrilo-3-acetic acid, polyacrylic acid, poly methacrylic acid, polymaleic acid, poly-2-acrylamide-2-methylpropane sulfonic acid, polystyrene sulfonic acid, etc.

These polyvalent organic acids may be included in the form of salts, and specifically, in the form of alkali metal salts, alkali rare earth metal salts, ammonium salts, amine salts, etc. The alkali metal salts or ammonium salts may be preferred for improvement of the hydrophilic property.

The hydrophilic coating composition of the present invention may further include a lower alcohol such as ethyl alcohol, isopropyl alcohol, etc.; a solvent such as toluene sulfonate, xylene sulfonate, urea, etc.; a viscosity modifier; a water insoluble abrasive; a humectant such as glycerin, sorbitol, etc.; other colors; etc. without impairing the object of the present invention.

The hydrophilic coating composition may be obtained by further adding other components of the above-described surfactant or polyvalent organic acid to the above-described copolymer and water, as needed, and then stirring and mixing the components by a known method, for example, with a homogenizer, a ultrasonic disperser, a high pressure disperser, etc.

The pH of the obtained hydrophilic coating composition may preferably be about 1.0 to about 7.0 in terms of handling safety, prevention of damage to the solid surface, and improvement of the hydrophilic property. To this end, the above-described additive or a pH adjuster may be used in an appropriate amount. When the pH is higher than a particular range, a condensation reaction of the silane functional groups at the end of the polymer may be activated, which may generate a problem in the storage stability of the coating composition.

The hydrophilic coating composition of the present invention may impart the hydrophilic property to the surface of a substrate by the following method. Here, the substrate is not particularly limited, and the hydrophilic coating composition may be applied to the surface of glass, porcelain, a ceramic, a metal, a polymer resin, a natural fiber, etc. With regard to the glass, ceramic, metal, synthetic resin, etc., a hydrophobic hard surface having a water contact angle of about 30 degrees or more is preferred.

A method of coating the hydrophilic coating composition is not particularly limited. For example, the hydrophilic coating composition may be coated by immersing a target substrate in the hydrophilic coating composition or by spraying the hydrophilic coating composition onto the surface of the substrate. Preferably, to improve a wetting property of the coating composition and to increase reactivity of the silanol or hydroxy group, the surface of the substrate is subjected to plasma treatment to reduce surface energy of the substrate, and thereafter, the coating composition may be applied onto the substrate, followed by drying.

The amount of coating may vary depending on properties of the substrate or the concentration of the hydrophilic coating composition, and for example, the coating composition may be applied in an amount of about 0.01 g to about 0.2 g per unit area of 10 cm², based on the weight of the copolymer.

A thickness of the coating layer after drying may be less than about 20 nm, preferably less than about 10 nm, or about 1 nm to about 10 nm, but is not limited thereto. The thickness may vary depending on conditions such as surface properties of the target substrate, etc.

Further, when the hydrophilic coating composition of the present invention is applied onto the surface of a glass substrate to impart the hydrophilic property to the surface of the glass, an initial water static contact angle may be less than about 15 degrees, preferably less than about 10 degrees, or about 0.1 degrees to about 10 degrees.

Here, the initial static contact angle means a water static contact angle which is measured without any other treatment such as changes of environmental conditions, etc., after coating the surface of the substrate.

Due to the hydrophilic property, surface contamination of the substrate may be effectively prevented or contaminants adhered to the surface may be effectively removed.

Hereinafter, the actions and effects of the present invention will be described in more detail with reference to specific examples. However, these examples are for illustrative purposes only, and the scope of the present invention is not intended to be limited thereby.

Example

Synthesis of Copolymer and Preparation of Coating Composition

Preparation Example 1: Preparation of Block Copolymer

To a 100 ml-reactor equipped with a nitrogen gas inlet pipe, a condenser, and a stirrer, 5.99 g of 2-(methacryloyloxy)-N,N-dimethyl-N-(2-sulfoethyl)ethanaminium hydroxide, 2.5 mg of 4-cyano-4-(phenylcarbonothioylthio)pentanoic acid, 54 g of distilled water, and 2.7 g of NaBr were introduced and stirred under a nitrogen atmosphere for 30 minutes.

Thereafter, the reactor was put in an oil bath which was set at 60° C., and 1.2 mg of VA-057 (2,2'-azobis[N-(2-carboxyethyl)-2-methylpropionamidine]hydrate) was introduced and reacted. During the reaction, 3 mg of 3-(triethoxysilyl)propyl methacrylate was introduced, and the reaction was allowed for a total reaction time of 6 hours to obtain 62 g of a block copolymer (solid polymer content: 10%). (Weight average molecular weight: 140,000 g/mol, PDI: 1.58)

Preparation Example 2: Preparation of Random Copolymer

To a 100 ml-reactor equipped with a nitrogen gas inlet pipe, a condenser, and a stirrer, 5.99 g of 2-(methacryloyloxy)-N,N-dimethyl-N-(2-sulfoethyl)ethanaminium hydroxide, 6 mg of 3-(triethoxysilyl)propyl methacrylate, 5 mg of 4-cyano-4-(phenylcarbonothioylthio)pentanoic acid, 54 g of distilled water, and 2.7 g of NaBr were introduced and stirred under a nitrogen atmosphere for 30 minutes.

Thereafter, the reactor was put in an oil bath which was set at 60° C., and 1.2 mg of VA-057 (2,2'-azobis[N-(2-carboxyethyl)-2-methylpropionamidine]hydrate) was introduced and reacted for 6 hours to obtain 62 g of a random copolymer (solid polymer content: 10%). (Weight average molecular weight: 240,000 g/mol, PDI: 1.74)

Preparation Example 3: Preparation of Random Copolymer

To a 100 ml-reactor equipped with a nitrogen gas inlet pipe, a condenser, and a stirrer, 5.99 g of 2-(methacryloyloxy)-N,N-dimethyl-N-(2-sulfoethyl)ethanaminium hydroxide, 3 mg of 3-(triethoxysilyl)propyl methacrylate, 2.5 mg of 4-cyano-4-(phenyl arbonothioylthio)pentanoic acid, 54 g of distilled water, and 2.7 g of NaBr were introduced and stirred under a nitrogen atmosphere for 30 minutes.

Thereafter, the reactor was put in an oil bath which was set at 60° C., and 0.6 mg of VA-057 (2,2'-azobis[N-(2-carboxyethyl)-2-methylpropionamidine]hydrate) was introduced and reacted for 6 hours to obtain 62 g of a random copolymer (solid polymer content: 10%). (Weight average molecular weight: 260,000 g/mol, PDI: 1.5)

Preparation Example 4: Preparation of Random Copolymer

To a 100 ml-reactor equipped with a nitrogen gas inlet pipe, a condenser, and a stirrer, 5.99 g of 2-(methacryloyloxy)-N,N-dimethyl-N-(2-sulfoethyl)ethanaminium hydroxide, 1.8 mg of 3-(triethoxysilyl)propyl methacrylate, 1.5 mg of 4-cyano-4-(phenylcarbonothioylthio)pentanoic acid, 54 g of distilled water, and 2.7 g of NaBr were introduced and stirred under a nitrogen atmosphere for 30 minutes.

Thereafter, the reactor was put in an oil bath which had been set at 60° C., and 0.4 mg of VA-057 (2,2'-azobis[N-(2-carboxyethyl)-2-methylpropionamidine]hydrate) was introduced and reacted for 6 hours to obtain 62 g of a random copolymer (solid polymer content: 10%). (Weight average molecular weight: 190,000 g/mol, PDI: 1.63)

Example: Preparation of Hydrophilic Coating Composition

Example 1-2

The copolymers prepared in Preparation Examples 1 (block copolymer) and 2 (random copolymer) were mixed at a ratio of 1:9 (solid content=10 wt %) to prepare a hydrophilic coating composition.

Example 1-3

The copolymers prepared in Preparation Examples 1 (block copolymer) and 3 (random copolymer) were mixed at a ratio of 1:9 (solid content=10 wt %) to prepare a hydrophilic coating composition.

Example 1-4

The copolymers prepared in Preparation Examples 1 (block copolymer) and 4 (random copolymer) were mixed at a ratio of 1:9 (solid content=10 wt %) to prepare a hydrophilic coating composition.

Comparative Examples 1 and 2

Each of the copolymers prepared in Preparation Examples 1 and 2 was used alone (solid content=10 wt %) to prepare a hydrophilic coating composition.

Experimental Example

Coating of Glass Substrate

Glass substrate: Glass for LCD, 75*50*0.7 mm, manufactured by SM Tech

The surface of the glass substrate was primarily washed with distilled water, and immersed in a 2 N NaOH aqueous solution for 10 minutes to activate silanol groups on the surface of the glass substrate.

The surface of the glass substrate was secondarily washed with distilled water, and water on the surface of the glass substrate was dried by air blowing.

Each of the coating compositions prepared in the examples and comparative examples was sprayed thereto in a coating amount of 0.1 mm$^3$ per 10 mm$^2$ (sprayed in an amount of 3.75 mm$^3$ to a width of 75 mm and a height of 50 mm), and the glass substrate was dried in an oven at 40° C. for 30 minutes, and at 80° C. for 30 minutes, and then washed with distilled water, and water on the glass surface was removed by air blowing to form a coating layer with a thickness of less than about 10 nm.

Evaluation Test of Initial Water Contact Angle

Water contact angles on the glass substrates of the examples and comparative examples which had undergone the coating process were measured using a contact angle meter.

Evaluation Test of Abrasion Resistance

The surfaces of the glass substrates of the examples and comparative examples which had undergone the coating process were rubbed under a load of 500 g using a double-sided cotton canvas (JIS L 3102. #10) 400 times, respectively, and then the water contact angles thereof were measured.

TABLE 1

| | Example 1-2 | Example 1-3 | Example 1-4 | Comparative Example 1 | Comparative Example 2 |
|---|---|---|---|---|---|
| Initial water contact angle degrees | 7 | 7 | 6 | 6 | 7 |
| Water contact angle degrees after evaluation of abrasion resistance | 16 | 16 | 12 | 23 | 20 |

Referring to Table 1, it was confirmed that when the polymer of the present invention was applied onto the surface of the glass substrate, the substrate surface showed an initial water contact angle of less than about 10 degrees, indicating that the substrate surface was modified to have an ultrahydrophilic property.

In particular, the examples of the present invention showed little change in the water contact angle even after being rubbed about 400 times with the double-sided cotton canvas, indicating that they have excellent adhesiveness to the substrate surface and abrasion resistance.

In other words, since the hydrophilic coating compositions of the examples of the present invention have excellent adhesiveness to the substrate surface and also have excellent abrasion resistance, it is expected that the hydrophilic property of the surface may be maintained for a long time, even if the surface is exposed to various environments after coating as well as at the initial stage of coating.

The invention claimed is:

1. A hydrophilic coating composition, comprising:
   a block copolymer including a first repeating unit represented by the following Formula 1 and a second repeating unit represented by the following Formula 2; and
   a random copolymer including the first repeating unit represented by the following Formula 1 and the second repeating unit represented by the following Formula 2:

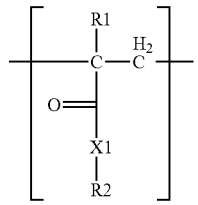

[Formula 1]

wherein, in Formula 1, R1 is hydrogen or a hydrocarbyl group having 1 to 10 carbon atoms, X1 is oxygen or a bivalent amine group (—NR'—), wherein R' is hydrogen or a hydrocarbyl group having 1 to 10 carbon atoms, and R2 is a zwitterionic group,

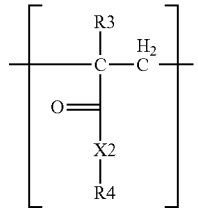

[Formula 2]

wherein, in Formula 2, R3 is hydrogen or a hydrocarbyl group having 1 to 10 carbon atoms, X2 is oxygen or a bivalent amine group (—NR"—), wherein R" is hydrogen or a hydrocarbyl group having 1 to 10 carbon atoms, and R4 is a silane moiety.

2. The hydrophilic coating composition of claim 1, wherein the block copolymer and the random copolymer each independently include the first repeating unit and the second repeating unit at a ratio of about 9:1 to about 99.9:0.1.

3. The hydrophilic coating composition of claim 1, wherein the zwitterionic group is represented by the following Formula 1-1:

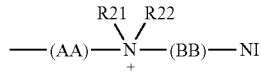

[Formula 1-1]

wherein, in Formula 1-1, R21 and R22 are each independently the same as or different from each other, and are a hydrocarbyl group having 1 to 10 carbon atoms, (AA) and (BB) are each independently the same as or different from each other, and are a hydrocarbylene group having 1 to 10 carbon atoms, and NI is —SO$_3$— or —CO$_3$—.

4. The hydrophilic coating composition of claim 1, wherein the silane moiety is represented by the following Formula 2-2:

[Formula 2-2]

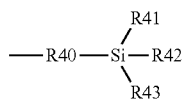

wherein, in Formula 2-2, R40 is a single bond or a hydrocarbylene group having 1 to 10 carbon atoms, and R41 to R43 are each independently the same as or different from each other, and are hydrogen, a hydroxy group, a hydrocarbyl group having 1 to 10 carbon atoms, or a hydrocarbyloxy group having 1 to 10 carbon atoms.

5. The hydrophilic coating composition of claim 1, wherein the block copolymer includes a repeating unit of the following Formula 3:

[Formula 3]

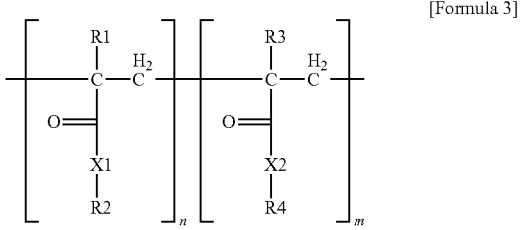

wherein, in Formula 3, R1 and R3 are each independently the same as or different from each other, and are hydrogen or a hydrocarbyl group having 1 to 10 carbon atoms, X1 and X2 are each independently the same as or different from each other, and are oxygen or a bivalent amine group (—NR'—), wherein R' is hydrogen or a hydrocarbyl group having 1 to 10 carbon atoms, R2 is a zwitterionic group, R4 is a silane moiety, n is an integer of 10 to 3000, and m is an integer of 1 to 50.

6. The hydrophilic coating composition of claim 1, wherein the block copolymer and the random copolymer have a weight average molecular weight of about 100,000 g/mol to about 800,000 g/mol, respectively.

7. The hydrophilic coating composition of claim 1, wherein the block copolymer and the random copolymer have a molecular weight distribution (PDI) of about 1.1 to about 3.0, respectively.

8. The hydrophilic coating composition of claim 1, wherein the block copolymer and the random copolymer have a RAFT reactive group at least one end thereof, respectively.

9. The hydrophilic coating composition of claim 1, further comprising a surfactant and a polyvalent organic acid.

10. The hydrophilic coating composition of claim 1, wherein the hydrophilic coating composition has pH of about 1.0 to about 7.0.

11. The hydrophilic coating composition of claim 1, wherein when the hydrophilic coating composition is coated onto the surface of a glass substrate, a water static contact angle is less than 15 degrees.

12. The hydrophilic coating composition of claim 1, wherein the hydrocarbyl group having 1 to 10 carbon atoms is linear or branched alkyl group having 1 to 10 carbon atoms.

13. The hydrophilic coating composition of claim 1, wherein the zwitterionic group is a betaine group wherein a positively charged atom and negatively charged atom is not adjacent to each other.

14. The hydrophilic coating composition of claim 3, wherein (AA) and (BB) is an alkylene group having 1 to 5 carbon atoms or an arylene group having 6 to 10 carbon atoms.

15. The hydrophilic coating composition of claim 3, wherein R21 and R22 is an alkyl group having 1 to 3 carbon atoms.

16. The hydrophilic coating composition of claim 4, wherein R40 is an alkylene group having 1 to 10 carbon atoms.

17. The hydrophilic coating composition of claim 8, wherein the RAFT reactive group is the following formula:

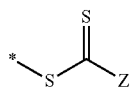

wherein, S is a sulfur atom, * is a portion linked to the repeating unit of the copolymer, and Z is a terminal end included in the RAFT reactive group and is a hydrocarbylene group having 1 to 10 carbon atoms.

18. The hydrophilic coating composition of claim 1, wherein the block copolymer and the random copolymer at a weight ratio about 5:5 to about 0.1:99.9.

* * * * *